United States Patent Office 3,591,328
Patented July 6, 1971

3,591,328
METHOD OF AND MEANS FOR CONTROLLING MOLD SPORES IN AIR-HANDLING SYSTEMS
Bela J. Szappanyos, 2480 W. Maple Road 48011, and Robert M. Eckerman, 942 Arden Lane 48009, both of Birmingham, Mich.
No Drawing. Continuation of abandoned application Ser. No. 466,829, June 24, 1965. This application Aug. 22, 1969, Ser. No. 871,723
Int. Cl. A61l 9/00; F24f 3/16; B44d 1/08
U.S. Cl. 21—58   9 Claims

ABSTRACT OF THE DISCLOSURE

A method of treating the air contacted and adjacent surfaces of air propelling devices of air conditioning and air treating equipment by applying thereto an admixture of a fungicide and an air driable solvent and having film-reinforcing ingredients therein to coat the surfaces and to dry thereon to form a fungus growth inhibiting coating thereon. The admixture is introduced into the air inlet of air conditioning or treating equipment while the air propelling mechanism is functioning.

---

This application is a continuation of Ser. No. 466,829, filed June 24, 1965 and now abandoned.

This invention relates to ventilation systems including the entire air-handling system for the environmental control of air for humans hereinafter referred to as air conditioning. More particularly our invention is directed to a method of treating the air contacted surfaces of the air propelling and associated components of such systems, with a coating to inhibit the growth of fungus spores. A spore is a conidium which emanates from fungus and which causes irritation in susceptible individuals.

We have observed that when the air conditioning system of an automobile is started after having been inactive for a period of time an objectionable odor is emitted from the air conditioning system. This phenomenon is noted in all types of air conditioning systems and is not limited to air conditioning systems used in vehicles. In susceptible people who are allergic to air-borne contaminants, an allergic reaction is noted. We have found that individuals possessing such allergic reactions are highly sensitive to fungus spores.

As our studies progressed it became apparent that an automobile ventilating system, such as would include an air conditioner, draws the air from the surrounding or ambient environment. Virtually all air includes fungus spores in varying proportions, and other contaminants. In the operation of the air conditioning systems, fungus spores are drawn into the air conditioning system from the surrounding or ambient environment and they are deposited on the evaporator and other surfaces of the system over which the air flows. When the air conditioning system is turned off, conditions are ideal for the growth of fungus spores because the evaporator and associated parts are wet from condensation of the ambient air being cooled, and it is dark and warm from the ambient temperature around the hot engine. The evaporator compartment and related parts thus possess all of the inherent characteristics required to initiate and sustain the rapid growth of the fungus spores with which the compartment is seeded.

When the engine is again started, and the air conditioning system is turned on, a blast of air flows through the evaporator and the associated parts which by that time have dried and on which a coating of fungus has grown containing the spores to which allergic people are sensitive. The flow of air through the evaporator transports many of the fungus spores and disseminates them through the passenger compartment where they react on allergically sensitive people, and cause irritations and odors referred to above.

The present invention provides a method of control to this problem of fungus growth from air-borne fungus spores by inhibiting the growth of the fungus in the air conditioner air-handling system by depositing a fungus inhibiting film or coating on the air contacted surfaces of the evaporator and the air propelling and associated components of air conditioning systems.

To be effective, this fungus inhibiting coating or film must possess several attributes, e.g. the coating must have low water solubility, be fungicidal with respect to fungus and the growth of air-borne spores and be capable of being air dried. Due to the inaccessability of the air contacted surfaces of an air-handling system, considerable difficulty would be experienced in directly applying a coating with these specific attributes. The removal of the air conditioning system from the automobile or other locale of use, and the dismantling of the system to gain access to the evaporator and the air propelling and associated components system is a time consuming task requiring considerable manipulative skill and special tools. The necessity of evolving a novel method of application of the fungus growth inhibiting film to the air contacted surfaces of the system will be readily appreciated.

We have succeeded in developing methods of applying fungus growth inhibiting coatings as well as the production of component parts, which can readily be applied to pre-assembled or existing air conditioning systems.

By our method we induce a flow of ambient air through the air conditioning system, and particularly over the heat exchange surfaces of the evaporator. The air conditioning system should be in the non-cooling cycle with the heat exchange surfaces dry for ideal application conditions. We introduce into this air stream a nebulized solution of a film forming fungicide which may contain film reinforcing ingredients, capable of being air dried to a non-tacky film of low water solubility. The introduction of the nebulized fluid into the air stream is continued ideally for a period of time sufficient to coat the evaporator and the air contacted surfaces of the air propelling and associated components. The flow of air through the air-handling system is continued until such time as the solvent odor is no longer evident.

In this manner, the fungicide is conveyed to and deposited upon most portions of the air conditioning unit which are most susceptible to fungus growth without the necessity for disassembling the system or removing any of the components thereof.

It is, therefore, an important object of our present invention to provide a new and novel method of applying fungus growth inhibiting materials in the air-handling system of an air conditioning unit by their deposition thereon.

It is another important object of our invention to provide a method of inhibiting the growth of fungus on the air contacted surfaces of air conditioning systems to prevent the growth of fungus during periods of inactivity of the system to prevent undesirable start-up characteristics due to the dissemination of fungus spores from intermittently operated air conditioning systems.

A further important object of the invention is the provision of a method for preventing the emission of air-borne spores from an intermittently operated air conditioning system, by the application to the asembled air-handling portions of the system of a fungus growth inhibiting film which prevents the growth of fungus planted from air-borne fungus spores carried into and distributed throughout the system by the circulation of the air delivered therethrough.

Other objects of this invention will appear in the following description and appended claims.

Before explaining the present invention in detail, it is to be understood that the invention is not limited in its application to the details of the method herein set forth, since it is capable of being practiced or carried out in various ways. Also, it is to be understood that the phraseology or terminology employed herein is for the purpose of description and not of limitation.

As hereinbefore explained, the present invention proposes the application of a fungus growth inhibiting fungicide on an air-handling system, and particularly the heat exchange surfaces of an air conditioning system.

In view of the fact that the evaporator is normally wet from the condensation of moisture from the air being cooled at the heat exchange surfaces of the evaporator and is dark because of its location in the air-handling system interiorly of the automobile, and warm because of the retained heat of the automotive engine following a period of operation, it forms an ideal growth environment for fungus from the spores which are deposited thereon and adhere thereto from the outside air delivered into the air-handling system. Thus, once the engine is stopped with the refrigerating cycle rendered non-operative for a period of time, fungus growth upon the evaporator and associated air contacted surfaces quickly occurs. Fungus growth can also occur in any portion of the air conditioning system which is exposed to the ambient air, although the conditions are not so ideal as those of the evaporator above enumerated.

Once this growth occurs, the next operation of the air conditioning system will draw additional intake air through the air-handling system, sweeping the emitted fungus spores from the evaporator compartment and other portions of the air-handling system and delivering them into the air conditioned space. The characteristic smell is indicative of this situation. Persons sensitive to air-borne spores thus experience undesirable reactions.

The same problem exists in window air conditioning units used in homes and small offices, and even in central air conditioning units of homes, buildings or the like, where the system is intermittently operative.

As hereinbefore explained, a fungus growth inhibiting film is deposited by the present invention on those portions of the air-handling system of the air conditioning units susceptible to fungus growth.

The film includes a fungicide which should possess the following characteristics:

(1) The fungicide itself should have low water-solubility to prevent the rapid removal of the fungicide from the evaporator and other air contacted surfaces of the associated components due to water condensation thereon and the gravity flow of the water thereover;

(2) The fungicide should be relatively non-volatile at the temperatures encountered in operation, particularly at the air conditioning unit;

(3) The fungicide should be soluble in a solvent which is air volatile at substantially ambient temperatures; and (4) The fungicide should be deposited from its solvent preferably as a non-pressure sensitive solid.

All of the above conditions presuppose that the fungicide is effective in inhibiting the growth of air-borne spores under the conditions encountered in the air-handling system of the air conditioning unit.

It has been found that dichlorophene (i.e. 2,2'-methylenebis-(4-chlorophenol)) fulfills all of the above conditions and is the preferred fungicide for utilization in the present invention.

Other suitable fungicides include tetrachlorophenol; phenylmercuric oleate and salicylanilide.

The film reinforcing additive should possess the following characteristics:

(1) It should be soluble in a solvent common to the fungicide;

(2) It should be non-toxic in use and nonflammable at the temperatures encountered in use;

(3) It must be capable of drying in air to form a dry film which is essentially nonpressure sensitive and not tacky, and the film as air dried should have low water-solubility; and (4) The film should neither block nor streamline the flow through the heat exchanger.

The presently preferred film-reinforcing ingredients of this invention are solvent-soluble phenol-formaldehyde resins in solid form. A suitable such resin is commercially available from Rohm & Haas Company under the trademark "Amberol" Resin No. 750.

To carry the fungicide and the film-reinforcing ingredients into the air-handling system, the fungicide and film-reinforcing ingredients are dissolved in a solvent which should possess the following characteristics:

(1) The solvent must dissolve both the fungicide and any film-reinforcing ingredients added and deliver to the air handling system while still in solution;

(2) The solvent should evaporate completely so as to be non-toxic to humans; and (3) The solvent must be volatile in moving air at atmospheric temperatures.

The presently preferred solvent is isopropyl alcohol, although other solvents such as ethyl alcohol, either a butyl or butyl alcohol, may be utilized, as may also be methyl ethyl ketone, acetone or other well known solvents.

The preferred specific composition is as follows:

| Ingredient: | Parts by volume |
| --- | --- |
| Isopropyl alcohol | 100 |
| Dichlorophene | 4 |
| Phenol-formaldehyde resins | 1 |

As previously explained, the preferred method of the present invention forms an air-borne nebulized solution of the composition, which nebulized solution is introduced into the air-handling system of the air conditioning unit to be borne through the air-handling system in a stream of air passing therethrough.

Such a stream of air can readily be induced through the air-handling system by merely starting the air conditioning system on its non-cooling air circulation cycle, so that air merely passes through the air-handling systems without any heat exchange. The air-borne nebulized solution of the above recited composition can readily be obtained by spraying the composition directly into the air stream, i.e. by dispensing the composition from an aerosol-type container, by means of a power or hand spray device, or by otherwise forming a nebulization of the liquid composition in the air stream.

Due to the nature of the ingredients, the composition is in the form of liquid droplets suspended in the air stream flowing through the air-handling system, and these droplets are readily deposited upon the walls of the conduits forming the air-handling system and upon the evaporator or other components interposed in the air-handling system.

During the introduction of the composition into the air-handling system, there will, of course, be a flow of intake air into the passenger compartment of the automobile or into the room, or rooms, supplied with air by the air-handling system. Since all of the ingredients are basically non-toxic, problems of toxicity are reduced to a minimum, but any possible discomfort can be avoided and the exit of intake air facilitated to promote the draft of air through the air-handling system by opening the windows of the automobile passenger compartment or of the room to which the air is being supplied.

It is preferred that the application of the composition be made at a time when the evaporator and other portions of the air-handling system are dry, and it is generally preferable to operate the air conditioning system, without refrigeration, by merely passing air therethrough, as above explained, for a period of time sufficient to insure dryness of these components.

The introduction of the composition into the air stream flowing through the air-handling system, ideally, is continued for a length of time sufficient to deposit at least a monomolecular layer of the fungicide and the film-forming ingredients on the evaporator and other air-handling system components.

After a sufficient amount of the composition has been introduced into the air stream, its introduction is terminated but the flow of air through the system is continued ideally until such time as the film has been air dried by evaporation of the solvent. Normally, this time can readily be determined by the absence of the odor of the solvent from the air introduced into the passenger compartment or room.

It has been found that the composition hereinbefore set forth is effective for a surprisingly length period of time. Single applications have been found to be effective for a period as long as ninety days. This surprising life is due to the fact that both the film-reinforming ingredient and the fungicide are of low water solubility, and the fungicide retains its full effectiveness so long as it is physically present. Of course, the film eventually dissipates from the abrasion of the inevitable dust particles flowing through the air-handling system and because of the minimal water solubility of the film.

The air propelling and associated components of the air-handling system can as one step in the manufacturing process be coated with the fungicide. The fungicide can be applied by aerosol nebulized spraying, conventional spraying, painting, dipping or any other means of applying a film of the fungicide to the parts.

From the foregoing, it will be appreciated that the present invention provides new and novel methods for the application to and retention upon an evaporator and other portions of an air-handling system of an air conditioning unit with a fungicidal composition capable of inhibiting the growth of fungus from air-borne spores, even though the conditions of moisture, light and heat in the air flow system are ideal to the normal growth of fungus.

Further, the method facilitates the application of the fungicidal coating of the air-handling system without requiring disassembly of the system.

While an exemplary method of the invention has been described in detail, it will be apparent to those skilled in the art that the disclosed method may be modified. Therefore, the foregoing description is to be considered exemplary rather than limiting, and the true scope of the invention is that defined in the following claims.

We claim:

1. In a method of treating the air contacted surfaces of air propelling and associated components of an intermittently operated air conditioning system, which, when rendered inoperative after a period of use, presents a damp and warm and dark environment favorable to the growth of fungus from environmental air, the improvement which comprises applying to the air propelling and associated components a low water-soluble, non-toxic, dry, non-tacky, film having fungicidal properties, by the steps of operating the air conditioning system to cause a flow of ambient air over the surfaces of the air propelling and associated components, spraying into the air stream an admixture of a fungicide and an air driable film-reinforcing ingredient in a volatile solvent, terminating the spraying of said admixture into said air stream only after substantially all of the surfaces of the air propelling and associated components exposed to the air stream have been coated thereby, and continuing the flow of air through said system and through said air propelling and associated components to evaporate said solvent and to air dry said fungicide and said film-reinforcing ingredient in situ thereon.

2. The method of applying a fungicide to the air contacted surfaces of air propelling and associated components of a pre-assembled air conditioning system to prevent the growth thereon of fungus resulting from the deposition of air-borne fungus spores, comprising the steps of starting and operating said system to induce a flow of ambient air through said air contacted surfaces to dry said surfaces, adding to said flow of air an air-borne suspension of an admixture of a fungicide and film-reinforcing ingredients in a solvent which is air driable to a non-tacky film thereby coating the air contacted surfaces of said air propelling and associated components with said suspension, and continuing to flow air through said air conditioning system to dry said suspension to a non-tacky state.

3. The method of reducing fungus spore dispersion by inhibiting fungus growth throughout the passenger compartment of an automobile having an intermittently operating automobile air conditioner including a heat exchanger and having air propelling and associated components, comprising the steps of operating said air conditioner to cause a flow of ambient air through said system and into said passenger compartment, admixing with said air stream a fluid suspension of fungicide and film-reinforcing materials, flowing said stream bearing said suspension through said system to coat at least the air contacted surfaces of the heat exchanger and the air propelling and associated parts with a nebulized solution, and air drying said nebulized solution in situ.

4. In a method of treating the air contacted surfaces of air propelling and associated components of an intermittently operated air conditioning system, which, when rendered inoperative after a period of use, presents a damp and warm and dark environment favorable to the growth of fungus from environmental air, the improvement of coating the air contacted components with a non-toxic, dry non-tacky film having fungicidal properties, by the steps of spraying into an air stream flowing through the air conditioning system a liquid admixture of a fungicide and air driable film reinforcing ingredients and continuing the flow of air alone through said system to air dry said fungicide and said film-reinforcing ingredients in situ therein.

5. A method of coating the air contacted surfaces of a completely assembled intermittently operable air conditioning system to prevent the physical discomfort of persons exposed to the output of said system, comprising the steps of injecting into a stream of air flowing through said system a fluid suspension of a low water-soluble fungicide for air-borne fungi, depositing at least a portion of said fungicide on said surfaces as a film, and continuing the flow of said air only through said system to air dry said fungicide in situ on said surfaces.

6. The method of combating fungus growth in and consequently preventing fungus spore dispersion throughout an intermittently operating air conditioning system having an evaporator and air propelling and associated components, comprising the steps of inducing the flow of a stream of air through said system, injecting into said air stream a nebulized solution of a low water-soluble fungicide for air-borne fungi, flowing said stream bearing said nebulized solution through said system to distribute said fungicide throughout said system and to deposit at least a portion of said fungicide on said evaporator and the air contacted surfaces of said system as a film, and continuing the flow of air through said system to air dry said fungicide in situ therein.

7. The method of applying a fungicide to a preassembled air conditioning system and particularly to the system evaporator and air propelling and associated air contacted components to prevent the growth thereon of fungi resulting from the deposition of air-borne fungus spores, comprising the steps of starting and operating said system without cooling to induce a flow of air through the evaporator and associated air contacted components, introducing into said flow of air an air-borne nebulized solution of a fungicide in admixture with film-reinforcing ingredients which are air driable to a non-tacky low water-soluble film, continuing the introduction of said admixture for a period of time sufficient to coat the air-contacted surfaces of said evaporator and associated components with said admixture, and later terminating the flow of air only after said film-reinforcing ingredients are air dried to a non-tacky film.

8. In a refrigerant air conditioning system comprising air propelling means, evaporator cooling means, and associated components, said evaporator cooling means being intermittently operable at a temperature below the dew point of the ambient environmental air, the improvement which comprises means operatively associated with said evaporator cooling means for inhibiting the reproduction of fungus on the air-contacting surfaces of said evaporator cooling means, said fungus inhibiting means comprising a tenacious coating of a fungicidal composition on said air-contacting surfaces of said evaporator cooling means, said composition having a low solubility in water whereby the coating is not easily removed by solution in water condensing on said air-contacting surfaces.

9. An air conditioning system in accordance with claim 8 wherein said composition comprises an admixture of a fungicide and a resinous film reinforcing agent.

References Cited
UNITED STATES PATENTS

| | | | |
|---|---|---|---|
| 3,017,239 | 1/1962 | Rodman | 21—58 |
| 3,116,969 | 1/1964 | Coleman | 21—74 |
| 3,126,428 | 3/1964 | Ash | 21—74UX |
| 3,191,915 | 6/1965 | Goettl | 21—74X |
| 3,433,578 | 3/1969 | Reid | 21—53 |

MORRIS O. WOLK, Primary Examiner

B. S. RICHMAN, Assistant Examiner

U.S. Cl. X.R.

21—2, 53, 61, 74; 62—78, 303; 117—104